United States Patent
Amino et al.

(10) Patent No.: US 9,108,665 B2
(45) Date of Patent: Aug. 18, 2015

(54) MOVING MECHANISM

(75) Inventors: Azusa Amino, Tokyo (JP); Ryosuke Nakamura, Tokyo (JP); Taishi Ueda, Tokyo (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 14/378,664

(22) PCT Filed: Mar. 5, 2012

(86) PCT No.: PCT/JP2012/055512
§ 371 (c)(1),
(2), (4) Date: Aug. 14, 2014

(87) PCT Pub. No.: WO2013/132571
PCT Pub. Date: Sep. 12, 2013

(65) Prior Publication Data
US 2015/0027801 A1 Jan. 29, 2015

(51) Int. Cl.
| | | |
|---|---|---|
| B62D 7/02 | (2006.01) | |
| B62D 6/00 | (2006.01) | |
| B62D 5/04 | (2006.01) | |
| B60G 11/04 | (2006.01) | |
| B60G 11/14 | (2006.01) | |

(52) U.S. Cl.
CPC ............ B62D 7/02 (2013.01); B60G 11/14 (2013.01); B62D 5/0418 (2013.01); B62D 6/002 (2013.01)

(58) Field of Classification Search
CPC .............. B60K 2007/0061; B60K 2007/007; B60K 2007/0092; B60K 2350/00; B62D 5/0418; B62D 5/04; B62D 5/0421
USPC .......................... 180/6.44, 6.48, 6.5, 411, 253
See application file for complete search history.

(56) References Cited

U.S. PATENT DOCUMENTS

| | | | |
|---|---|---|---|
| 3,788,444 A * | 1/1974 | McWilliams | 198/304 |
| 4,219,094 A * | 8/1980 | Sturgill | 180/236 |
| 5,547,038 A * | 8/1996 | Madwed | 180/253 |
| 5,609,220 A * | 3/1997 | Moriya et al. | 180/253 |
| 6,109,379 A * | 8/2000 | Madwed | 180/65.51 |
| 6,491,127 B1 * | 12/2002 | Holmberg et al. | 180/252 |
| 7,617,890 B2 * | 11/2009 | Romig | 180/6.48 |
| 2007/0256868 A1* | 11/2007 | Romig | 180/6.5 |
| 2011/0232027 A1* | 9/2011 | Block et al. | 16/20 |
| 2015/0083509 A1* | 3/2015 | Borroni-Bird et al. | 180/204 |

FOREIGN PATENT DOCUMENTS

| | | |
|---|---|---|
| JP | 57-201770 A | 12/1982 |
| JP | 09-086197 A | 3/1997 |
| JP | 10-310078 A | 11/1998 |
| JP | 2007-030860 A | 2/2007 |
| JP | 2011-045973 A | 3/2014 |
| WO | 2010/147100 A1 | 12/2010 |

* cited by examiner

*Primary Examiner* — Tony Winner
(74) *Attorney, Agent, or Firm* — Mattingly & Malur, PC

(57) ABSTRACT

The moving mechanism is capable of separating an orientation of a vehicle body from a traveling direction. In addition, the moving mechanism has a low center of gravity and is capable of reducing its weight. A moving body includes a vehicle body, steering actuators, right and left steering hubs, vehicle wheel actuators, and vehicle wheels. The steering actuators are disposed on the right and left sides of the vehicle body and drivable around a vertical axis. The right and left steering hubs are driven by the steering actuators. The vehicle wheel actuators are fixed to the steering hubs. The vehicle wheels are driven by the vehicle wheel actuators and are disposed in an inclined manner with respect to a vertical direction.

8 Claims, 9 Drawing Sheets

(a)

(b)

MOVING MECHANISM

TECHNICAL FIELD

The present invention relates to a moving mechanism which has a moving unit with inverted two vehicle wheels of an aspect in which the two vehicle wheels run in an inverted manner as being grounded to a traveling surface. The moving mechanism herein also provides stability in a front-back (traveling) direction and in a right-left direction.

BACKGROUND ART

Technology for a moving mechanism in the related art has been known, for example, as recited in PTL 1. The moving mechanism herein changes a traveling direction without changing an orientation of a vehicle body while the moving mechanism is driven in the traveling direction.

According to a method disclosed in PTL 1, the moving mechanism includes right and left vehicle wheels facing a different orientation from right and left vehicle wheels disposed on the front and back sides of the moving mechanism. The former right and left vehicle wheels herein are rotatably attached to the vehicle body through a supporting shaft. Depending on situations, grounding is switched between the right and left vehicle wheels on the front and back sides of the moving mechanism and the other right and left vehicle wheels facing the different orientation to change the traveling direction.

CITATION LIST

Patent Literature

PTL 1: JP 9-86197 A (FIGS. 1 and 2, for example)

SUMMARY OF INVENTION

Technical Problem

However, in the related art disclosed in PTL 1, a vehicle wheel which supports the weight of a vehicle body is switched to another different vehicle wheel at the moment of changing a moving direction. Therefore, the other different vehicle wheel is subject to external force from a traveling surface. That causes impact force on the vehicle body in an up-down direction. As a result, in switching the vehicle wheels, there is a possibility that the vehicle body loses its balance depending on a load balance of the vehicle body, that is, a positional relation between a center of gravity of the vehicle body and the impact force. In a configuration of this method, one pair of moving devices among two is selected depending on an orientation of traveling (traveling direction) of the vehicle body. Therefore, there is a possibility that the weight of the moving device itself becomes large.

Further, in a configuration used in an usual car, in cases where a vehicle wheel is steered in all directions (360 degrees around a vertical axis) by a steering, structural members supporting a suspension and the vehicle wheel structurally interferes with, or clashes with the vehicle wheel during steering. This is because the vehicle wheel herein is cantilevered. As a result of this configuration, a steering angle of the vehicle wheel is restricted.

Therefore, as shown in FIG. 11, when a steering device 201 and a suspension 202 are built in a vertical direction on the top of a vehicle wheel 200 based on the configuration in the related art, the vehicle wheel 200 does not interfere with the suspension 202 or the steering device 201. Therefore, it is possible to steer the vehicle wheel in all directions (360 degrees around the vertical axis). However, there occurs another problem that the whole configuration of the device becomes large in the up-down direction. This problem causes an increase in the weight and in fuel of the device, which results in an increase in costs.

In view of the above-mentioned actual situation, an object of the present invention is to provide a moving mechanism which is capable of separating an orientation of a vehicle body from a traveling direction and has a low center of gravity and is capable of reducing its weight.

Solution to Problem

In order to achieve the above-mentioned object, a moving mechanism according to claim 1 of the present invention includes:

a vehicle body;

steering actuators which are disposed on the right and left sides of the vehicle body and are drivable around a vertical axis;

right and left steering hubs which are driven by the steering actuator;

vehicle wheel actuators which are fixed to the steering hubs; and vehicle wheels which are driven by the vehicle wheel actuators and are disposed in an inclined manner relative to a vertical direction.

Advantageous Effects of Invention

According to the present invention, it is possible to achieve a moving mechanism which is capable of separating an orientation of a vehicle body from a traveling direction and has a low center of gravity and is capable of reducing its weight.

DESCRIPTION OF EMBODIMENTS

Figure 1:
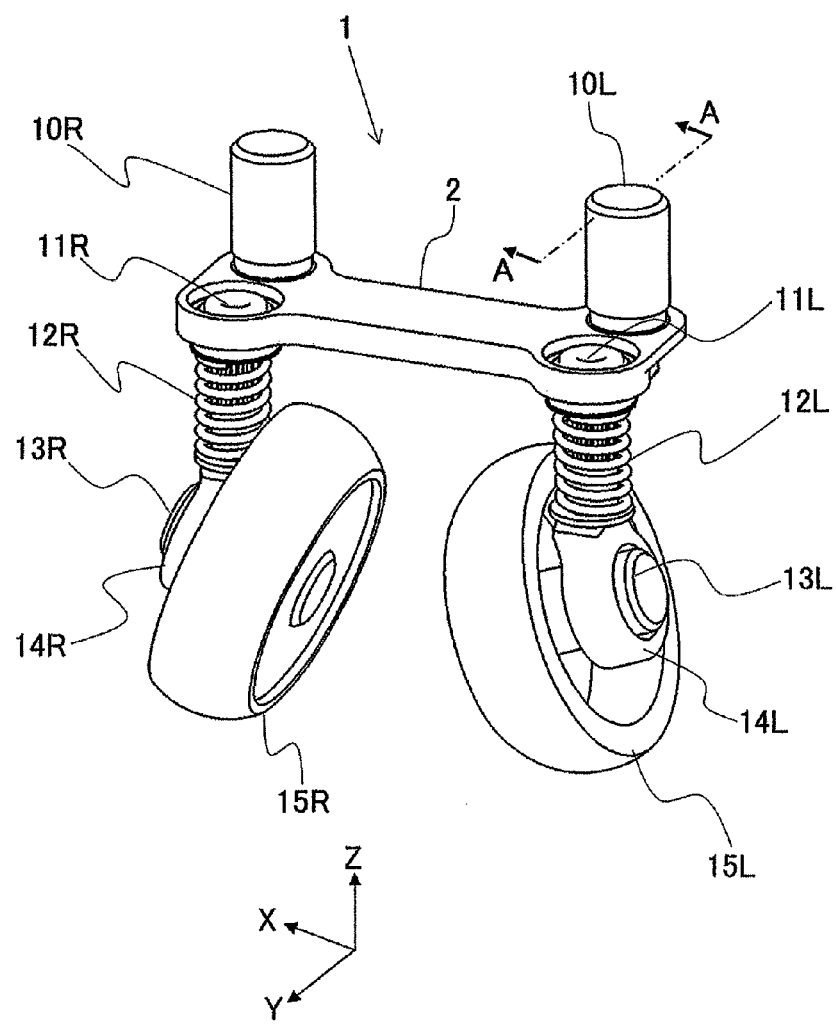
FIG. 1 is a view of a moving mechanism, according to an embodiment of the present invention, seen from obliquely above in a traveling direction.

Hereinafter, an embodiment of the present invention will be described with reference to the accompanying drawings. FIG. 1 is a view of a moving mechanism 1, according to the embodiment of the present invention, seen from obliquely above in a traveling direction. In FIG. 1, the traveling direction of the moving mechanism 1 is represented as a y-axis, an axis orthogonal to the y-axis and parallel to a horizontal plane of the traveling direction is represented as an x-axis, and an axis in a vertical direction orthogonal to the x-axis and the y-axis is represented as a z-axis. Herein, a rotation around the y-axis is called a roll direction, a rotation around the x-axis is called a pitch direction, and a rotation around the z-axis is called a yaw direction. These directions apply hereinafter unless otherwise specified.

The moving mechanism 1 of the embodiment includes a vehicle body 2, steering actuators 10L and 10R, and splines 11L and 11R. The vehicle body 2 is in a symmetric shape with respect to a Y-Z surface of a vertical plane. The steering actuators 10L and 10R are attached to the right and left sides of the vehicle body 2 and have a rotating direction of outputs around the z-axis of a vertical axis (in the yaw direction). The splines 11L and 11R rotate around the z-axis (in the yaw direction) by the outputs of the steering actuators 10L and 10R through a transmitting unit such as a belt. Note that each of the splines 11L and 11R is in an elongated shape which extends in the z-axis direction (vertical direction).

The moving mechanism 1 further includes steering hubs 14L and 14R, vehicle wheel actuators 13L and 13R, and vehicle wheels 15L and 15R. The steering hubs 14L and 14R are connected to the lower ends of the splines 11L and 11R respectively. The vehicle wheel actuators 13L and 13R are fixedly connected to the steering hubs 14L and 14R respectively, and each rotation shaft thereof is inclined at a predetermined angle with respect to the x-axis (horizontal axis). The vehicle wheels 15L and 15R are connected to the rotation shafts of the vehicle wheel actuators 13L and 13R and are rotatably driven.

Between the vehicle body 2 and each of the steering hubs 14L and 14R, there are provided suspension springs 12L and 12R as vibration absorbing devices in order to prevent external force applied to the vehicle wheels 15L and 15R from transmitting to the vehicle body 2.

The upper ends of the suspension springs 12L and 12R are respectively abutted to the lower parts of the right and left sides of the vehicle body 2. At the same time, the lower ends of the suspension springs 12L and 12R are respectively abutted to the steering hubs 14L and 14R. Further, the suspension springs 12L and 12R expand or contract due to elastic deformation while involving the splines 11L and 11R as guides, which are disposed while penetrating the centers of the suspension springs 12L and 12R.

<Controlling System of Moving Mechanism>

Figure 2:
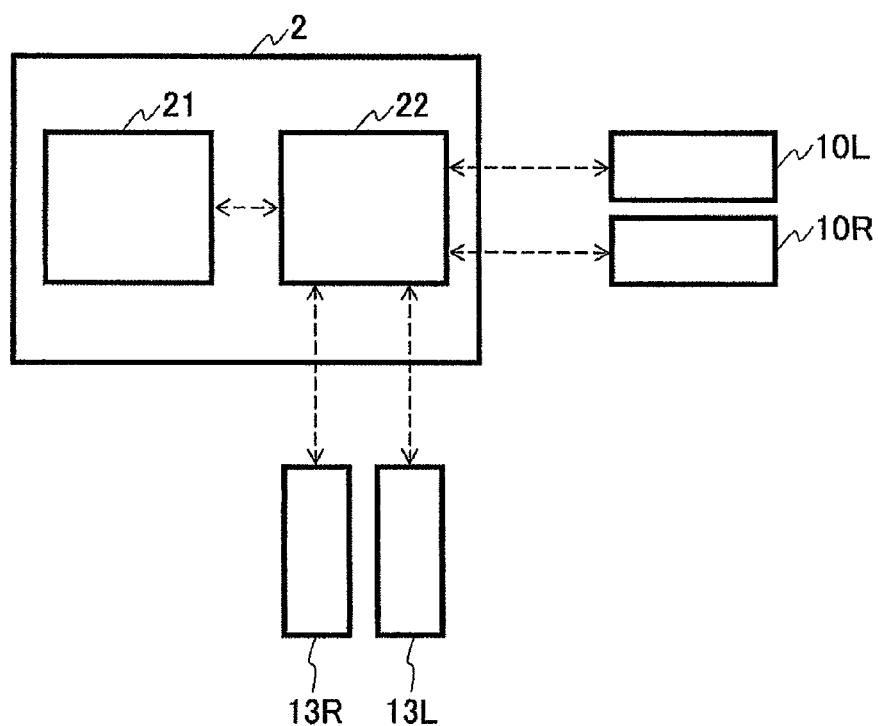
FIG. 2 is a block diagram showing a controlling system of a moving mechanism.

FIG. 2 is a block diagram showing a controlling system of the moving mechanism. The vehicle body 2 includes a posture measuring unit 21 of an angle sensor such as a gyroscope which measures its own posture (e.g. angle and angular speed), and a controller 22 which controls the steering actuators 10L, 10R and the vehicle wheel actuators 13L, 13R of the moving mechanism 1 based on its own posture and conditions.

Each of the steering actuators 10L, 10R and the vehicle wheel actuators 13L, 13R includes a power source (for example, an electric motor), a reducer which changes a reduction ratio of the power source, and an angle detector which detects a rotation angle. Further, the steering actuators 10L, 10R and the vehicle wheel actuators 13L, 13R drive and control components connected to output terminals thereof. Examples of the angle detector include a rotary encoder and a potentiometer.

The controller 22 reads measurement signals (measurement values showing the angle and the angular speed of the vehicle body 2) according to the posture of the vehicle body 2, provided by the posture measuring unit 21 built in the vehicle body 2. The controller 22 further drives the steering actuators 10L, 10R and the vehicle wheel actuators 13L, 13R and also controls the vehicle wheels 15L, 15R so as to maintain an inverted posture by the vehicle wheels 15L, 15R (see FIG. 1).

<Suspension Device>

Figure 3:
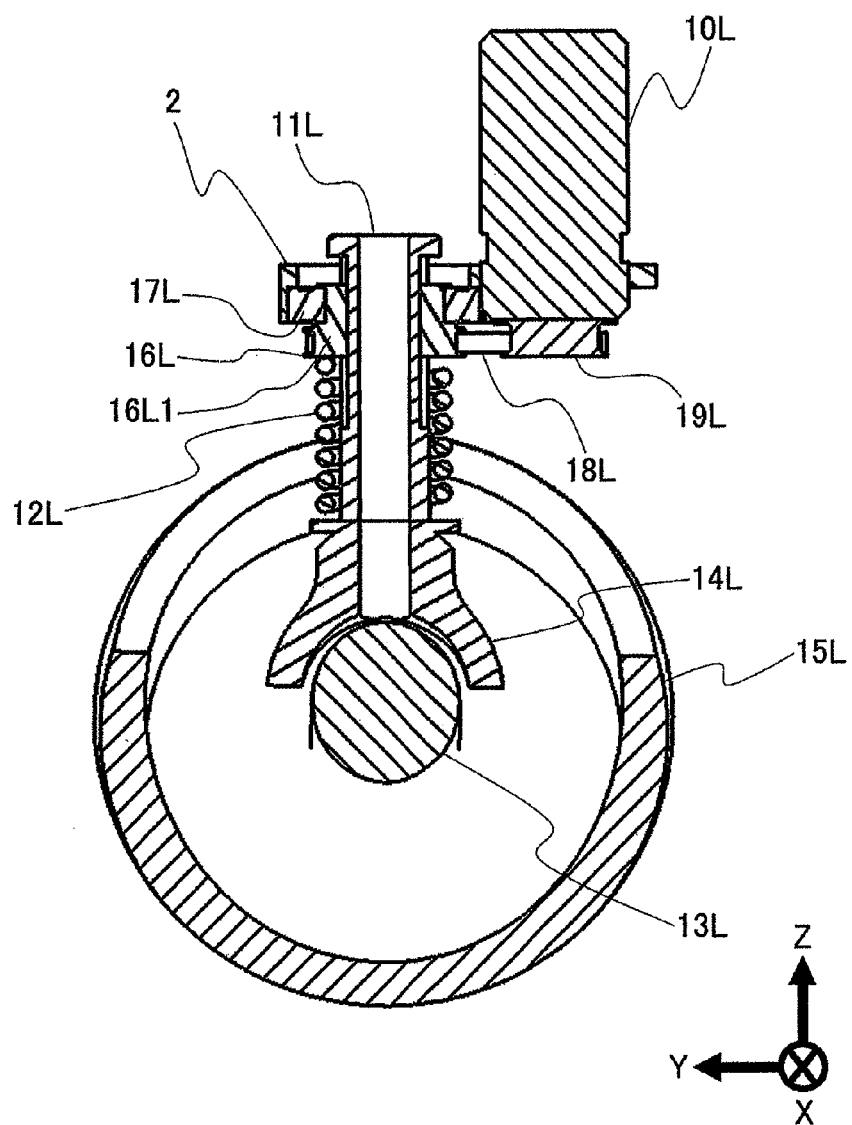
FIG. 3 is a cross-sectional view taken along line A-A in FIG. 1.

FIG. 3 is a cross-sectional view taken along A-A line in FIG. 1 (cross-sectional view of the Y-Z surface which passes through the center of the spline 11L in FIG. 1). The moving mechanism 1 is in a symmetrical shape with respect to the Y-Z surface of the vertical plane. Therefore, a configuration of the moving mechanism 1 will be hereinafter described in detail with an example of a configuration on the left side (see FIG. 3), and description for a configuration on the right side will be omitted herein. A steering actuator pulley 19L which rotates around the z-axis (in the yaw direction) is attached to the output of the steering actuator 10L. The steering actuator pulley 19L rotatably drives a spline guide 16L at a predetermined position through a wrapping transmission belt 18L.

The spline guide 16L is a member in a substantially cylindrical shape. An external lower side of the spline guide 16L includes a pulley 16L1 and is driven while being wrapped with the belt 18L. On the other hand, an external upper side of the spline guide 16L is rotatably disposed, through a bearing 17L, to the vehicle body 2 around the vertical z-axis. The bearing 17L herein can accept a moment, around the z-axis (in the yaw direction) and around the x-axis (in the pitch direction), from the vehicle body 2 and the spline guide 16L. Examples of such a bearing include a cross roller bearing with which a roller is brought into line contact. In an internal surface of the spline guide 16L, a recess-shaped ditch is incised in a z-direction. The spline guide 16L herein is slidably connected in the z-axis direction (vertical direction) while the recess-shaped ditch thereof engages with a protrusion of the spline 11L and transmits a rotation around the z-axis.

The spline 11L is a member in a substantially cylindrical shape. In an external side thereof, a recess-shaped ditch is incised in the z-direction. In an internal side thereof, a space is provided through which a wire to be connected to the vehicle wheel actuator 13L can be inserted. The steering hub 14L, to which the vehicle wheel actuator 13L is fixedly connected, is fixedly connected to the lower end of the spline 11L. The uppermost part of the spline 11L is formed larger than the internal diameter of the spline guide 16L in order to prevent the spline 11L from dropping off the spline guide 16L.

The suspension spring 12L is a compression coil spring. In the suspension spring 12L, the spline 11L which penetrates the center thereof is disposed as a guide during expansion and contraction movement of the elastic deformation. The upper and lower ends of the suspension spring 12L are respectively suspended by the spline guide 16L and the steering hub 14L. As a result, impact due to irregularities of a ground is input to the vehicle wheel 15L and is moderated by the suspension spring 12L through the steering hub 14L. In other words, the external force which is to be applied to the vehicle wheel 15L and the vehicle body 2 from the ground (traveling surface) is absorbed by elastic energy and by internal friction of a spring wire rod due to the elastic deformation of the suspension spring 12L.

<Configuration Around Vehicle Wheel 15L (15R)>

Figure 4:
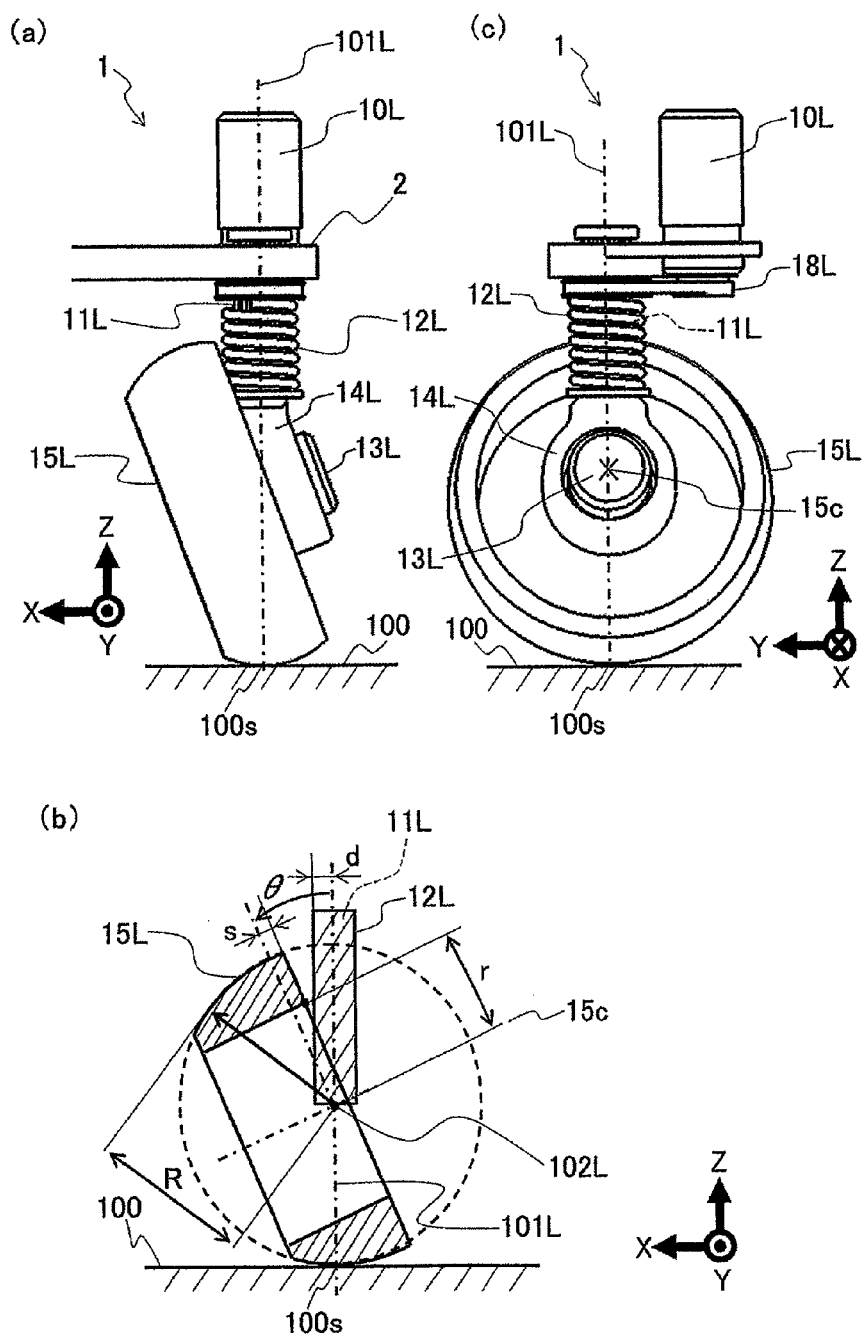
FIG. 4(a) is a view showing a moving mechanism in which a vehicle wheel faces frontward so that the moving mechanism runs frontward.
FIG. 4(b) is a cross-sectional view of an X-Z surface, which passes through a steering axis in FIG. 4(a), showing the vehicle wheel in contact with a ground in a case of FIG. 4(a).
FIG. 4(c) is a view of the moving mechanism seen from the left side of the vehicle body.

FIG. 4(a) is a view showing the moving mechanism 1 in which the vehicle wheel 15L faces frontward so that the moving mechanism 1 runs frontward. A status that the vehicle wheel 15L is in contact with the ground in a case of FIG. 4(a) is shown in a cross-sectional view of an X-Z surface, in FIG. 4(b), which passes through a steering axis 101L in FIG. 4(a). FIG. 4(c) is a view of the moving mechanism 1 seen from the left side of the vehicle body 2.

As shown in FIG. 4(b), a central point of a cross-sectional vehicle wheel 102L is provided on the steering axis 101L of a central axis of the spline 11L. A grounding point 100s between the vehicle wheel 15L and a ground 100 is also provided on the steering axis 101L. The reason therefor is that a moment of force, around the steering axis 101L (central axis of the spline 11L), which is applied to the vehicle wheel 15L from the ground 100 becomes "0", when the grounding point 100s between the vehicle wheel 15L and the ground 100 is provided on the central axis of the spline 11L (steering axis 101L). Further, a distance from the vehicle body 2 to the grounding point 100s can be minimized. Therefore, an effect of external force applied to the spline 11L and the vehicle body 2 from the ground 100 through the vehicle wheel 15L can be minimized.

Further, an X-Z cross-sectional surface of the vehicle wheel 15L which passes through the steering axis 101L is in a shape where the right and left sides of a circle having a radius R are partially removed. The circle herein centers on the central point of the cross-sectional vehicle wheel 102L which is disposed on the steering axis 101L. As a result, a shape in which the vehicle wheel 15L touches the ground 100 becomes symmetric in an x-axis direction with respect to the grounding point 100s between the vehicle wheel 15L and the ground 100.

Accordingly, force received by the vehicle wheel 15L from the ground 100 becomes symmetric in the x-axis direction with respect to the grounding point 100s. That results in the vehicle wheel 15L keeping the balance of the force received from the ground 100. In other words, the vehicle wheel 15L is subjected to force symmetric in the x-axis direction with respect to the grounding point 100s. In addition, a cross-sectional shape of the vehicle wheel 15L is a circle as shown in FIG. 4(b). Therefore, even in a case where the moving mechanism 1 inclines, a sudden change of a grounding state can be avoided.

<Condition not to Bring Vehicle Wheel 15L (15R) into Contact with Suspension Spring 12L (12R)>

The following Formula (1) is geometrically derived as a condition not to bring the vehicle wheel 15L (15R) into contact with the suspension spring 12L (12R). In FIG. 4(b), an internal diameter of the vehicle wheel 15L is represented as "r". Herein, a distance from the central point of the cross-sectional vehicle wheel 102L to a cross-sectional surface on the steering side of the vehicle wheel 15L is represented as "s". Further, an inclination angle of the vehicle wheel 15L from the steering axis 101L is represented as "θ". Finally, a distance from the steering central axis 101L (central axis of the spline 11L) of the suspension spring 12L to the side of the vehicle wheel 15L is represented as "d". In the above-mentioned cases, a dimensional relation in which the vehicle wheel 15L and the suspension spring 12L do not interfere with each other can be represented by the following Formula (1).

[Formula 1]

$$d < r \sin \theta - s \cos \theta \quad (1)$$

The moving mechanism 1 is configured using the dimensional relation of the Formula (1). Note that the internal portion of the vehicle wheel 15L (15R) may be cut off to provide a recess in order to satisfy the Formula (1).

As shown in FIG. 4(b), the grounding point 100s between the vehicle wheel 15L and the ground exists on the steering axis 101L. Therefore, as shown in FIG. 4(c), a rotation center 15c of the vehicle wheel 15L is located on an X-Z horizontal surface which passes through the steering axis 101L. As a result, even in a case where the steering actuator 10L is driven, the vehicle wheel 15L is rotated around the steering axis 101L, and the orientation of the vehicle wheel 15L is arbitrarily changed, the positional relation between the grounding point 100s, which is between the vehicle wheel 15L and the ground 100, and the steering axis 101L is always in the same straight line and does not change. Further, as mentioned above, the distance from the grounding point 100s to the vehicle body 2 can be minimized.

Accordingly, friction force (kinetic friction force and static friction force) between the vehicle wheel 15L and the ground 100, which is a grounding surface, can be minimized to act on the moving mechanism 1. Further, since no extra torque is applied to the steering actuators 10L and 10R, a large torque is not necessary and an actuator with a small output is sufficient.

By contrast, unlike the present configuration, in cases where the grounding point 100s between the vehicle wheel 15L and the ground 100 is not located on the steering axis 101L (central axis of the spline 11L), a moment, in which a distance between the steering axis 101L and the grounding point 100s has a length of an arm, is applied to the vehicle body 2 through the spline 11L. Further, the distance from the grounding point 100s to the vehicle body 2 becomes longer. Accordingly, force acting on the moving mechanism 1 from the ground 100 becomes large, which results in an unnecessary torque acting on the steering actuator 10L.

Further, in cases where a reduction ratio between the steering actuator pulley 19L of the steering actuator 10L and the pulley 16L1 of the spline guide 16L, shown in FIG. 3, is small, an acting speed of the steering of the vehicle wheel 15L can be heightened.

In addition, as shown in FIG. 4(a), the vehicle wheel 15L is configured to incline from the vertical direction, and the suspension spring 12L can be connected to a position adjacent to the vehicle wheel actuator 13L. Therefore, a configuration from the steering actuator 10L to the spline guide 16L (see FIG. 3), and structural members included in the spline 11L, the steering hub 14L and the like can be downsized. Accordingly, all components around the vehicle wheel 15L can be disposed near the vehicle wheel 15L and a center of gravity can be lowered. As the center of gravity of the moving mechanism 1 is provided in the lower part, stability of the moving mechanism 1 improves.

In the present configuration, the example in which the grounding point 100s between the vehicle wheel 15L and the ground 100 is disposed on the steering axis 101L (central axis of the spline 11L) has been described. However, it is not always necessary to dispose the grounding point 100s on the steering axis 101L as long as the grounding point 100s is disposed near the steering axis 101L. It should be noted, however, that it is most preferable to dispose the grounding point 100s on the steering axis 101L as mentioned above.

<Example of Controlling Moving Mechanism 1>

Figure 5:
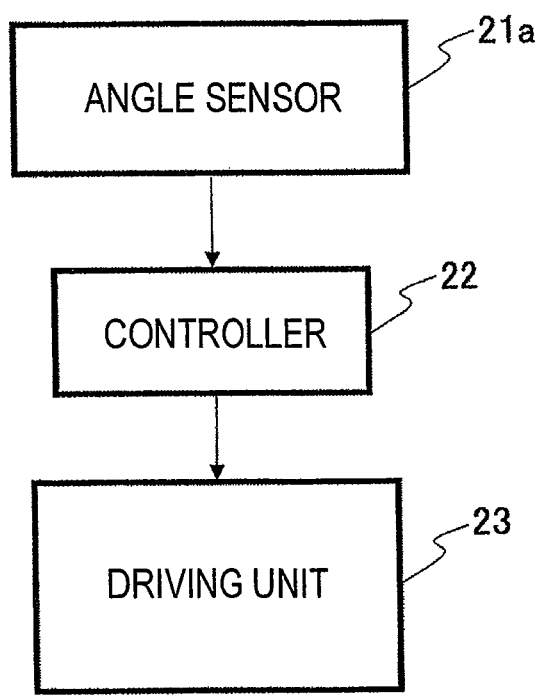
FIG. 5 is a block diagram of an example of controlling a moving mechanism.

Next, an example of controlling the moving mechanism 1 will be described. FIG. 5 is a block diagram of an example of controlling the moving mechanism 1. An angle sensor 21a, which is the posture measuring unit 21 of the vehicle body 2 (see FIG. 2), is included in the vehicle body 2. The angle sensor herein detects an inclination angle and an angular speed of an inclination in a front-back direction (traveling direction or y-axis direction) with respect to a gravity direction (z-axis direction) of the vehicle body 2, and of an inclination in a right-left direction (a direction vertical to the traveling direction on a horizontal plane, or x-axis direction). Based on detected information of sensor signals detected by the angle sensor 21a, a controller 22 carries out a feedback control so that the inclination and the angular speed of the vehicle body 2 match target values. Then, the controller 22 appropriately controls a driving unit 23 such as the steering actuators 10L, 10R and the vehicle wheel actuators 13L, 13R.

Figure 6:
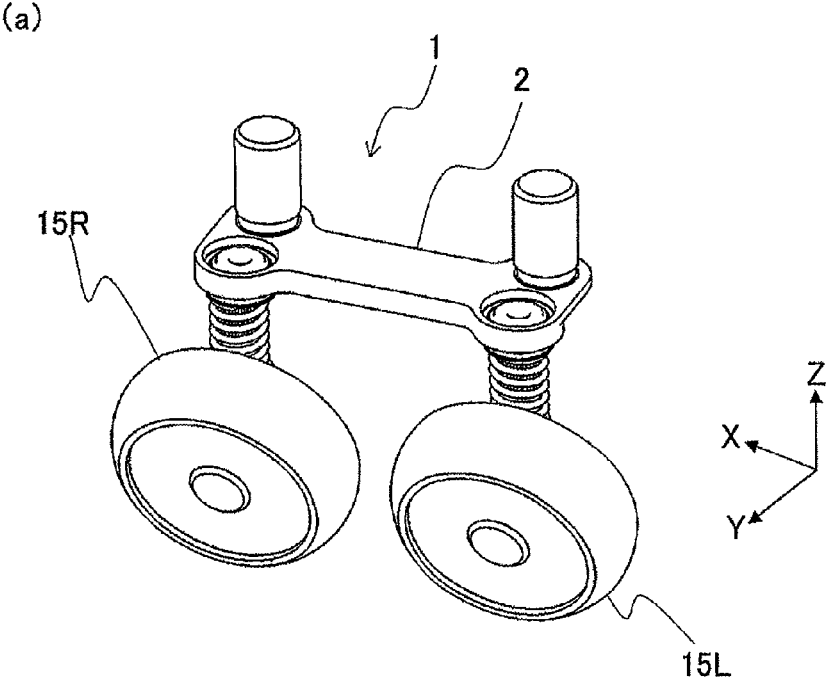
FIG. 6(a) is a view of a moving mechanism in which vehicle wheels face orthogonally with respect to a traveling direction of a vehicle body so that the moving mechanism moves in a right-left direction with respect to the traveling direction of the vehicle body.
FIG. 6(b) is a view showing a status that the vehicle wheels move while changing an orientation thereof from the traveling direction of the vehicle body.
Figure 6:
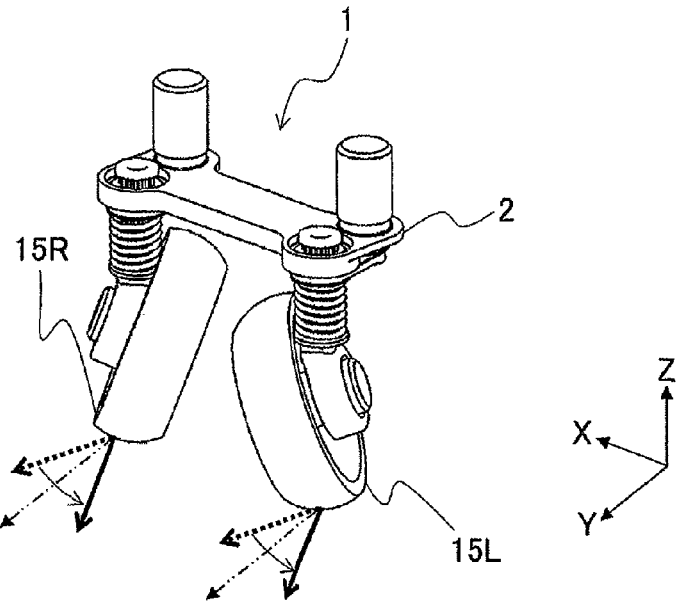

FIG. 6(a) is a view of the moving mechanism 1 in which the vehicle wheels 15L and 15R face orthogonally (in the x-axis direction) with respect to the traveling direction (y-axis direction) of the vehicle body 2 so that the moving mechanism 1 moves in the right-left direction with respect to the traveling direction of the vehicle body 2. When the moving mechanism 1 moves normally, the vehicle wheels 15L and 15R face a direction parallel to the traveling direction (y-axis direction) of the vehicle body 2 as shown in FIG. 1, and the moving mechanism 1 moves with inverted two vehicle wheels.

On the other hand, suppose a case where the moving mechanism 1 moves in the right-left direction without changing the orientation of the vehicle body 2 as shown in FIG. 6(a). Alternatively, suppose a case where the moving mechanism 1 loses its balance between the right and left because of an upthrust due to an uneven road or the traveling surface (or because of impact force in the z-axis direction), or because of contact between the moving mechanism 1 and an obstacle in a traveling path. In the above-mentioned cases, the traveling direction of the vehicle wheels 15L and 15R faces orthogonally with respect to the traveling direction (y-axis direction) of the vehicle body 2 as shown in FIG. 6(a), and the moving mechanism 1 moves in the right-left direction (in the x-axis direction). As a result, an inclination of the vehicle body 2 in the right-left direction can be suppressed.

Further, in a case of changing only a traveling route without changing the orientation of the vehicle body 2, as shown in FIG. 6(b) with solid arrows and dashed arrows, the traveling direction of the vehicle wheels 15L and 15R is changed from the traveling direction of the vehicle body 2 (from the y-axis direction or from a direction oriented by arrows with two-dot chain lines in FIG. 6(b)) to move the vehicle body 2.

In other words, as shown in FIGS. 4(a) to 4(c), the moving mechanism 1 is configured to rotate, separately from the vehicle body 2, the vehicle wheels 15L and 15R around the splines 11L and 11R (around the vertical z-axis) by using the steering actuators 10L and 10R. Therefore, the orientation of the vehicle body 2 and a moving direction of the vehicle body 2 can be controlled freely and separately. In this manner, the stability in the front-back direction (traveling direction) of the moving mechanism 1 according to the present embodiment can be achieved by rotations of the vehicle wheels 15L and 15R which are the inverted two vehicle wheels.

On the other hand, a disturbance in the right-left direction (in the x-axis direction) vertical to the orientation of the vehicle body 2 (y-axis direction) cannot be fully absorbed by the suspension springs 12L, 12R. However, by changing the orientation of the right-and-left vehicle wheels 15L and 15R, driving the vehicle wheels 15L and 15R, and moving the moving mechanism 1 in a direction in which external force applied to the vehicle body 2 can be released (an orientation in which the external force is applied to the vehicle body 2), the stability of the vehicle body 2 can be acquired.

Further, by disposing the vehicle wheels 15L, 15R symmetrically in an inclined manner as shown in FIG. 1, force and moment which act in a direction vertical to the traveling direction of the vehicle wheel 15L and 15R can be negated. As a result, the moving mechanism 1 can run stably.

According to the embodiment, the vehicle wheels 15L and 15R are inclined from the vertical direction, and the vehicle wheels 15L, 15R are steered as being rotated around the splines 11L, 11R respectively. Therefore, the vehicle wheels 15L, 15R can be steered in all directions (360 degrees around the vertical z-axis), and the vehicle wheels 15L, 15R can be configured not to come into contact with components of the suspension device. Further, the orientation of the vehicle body 2 and the traveling direction of the vehicle wheels 15L, 15R can be separated.

Further, the grounding point 100s between the steering axis 101L (central axis of the spline 11L) and the vehicle wheel 15L is located on the same axis. Therefore, a small torque is sufficient in driving the steering. Moreover, since the vehicle wheels 15L, 15R are inclined and the suspension springs 12L, 12R are disposed near the vehicle wheels 15L, 15R respectively, components around the vehicle wheels 15L, 15R can also be disposed near the vehicle wheels 15L, 15R. Therefore, the center of gravity of the moving mechanism 1 can be lowered, and the stability of the moving mechanism 1 improves. Further, components of the suspension device of the vehicle wheels 15L, 15R can be downsized, and the weight of the moving mechanism 1 can be reduced. Therefore, fuel efficiency of the moving mechanism 1 improves.

<<Modification 1>>

Figure 7:
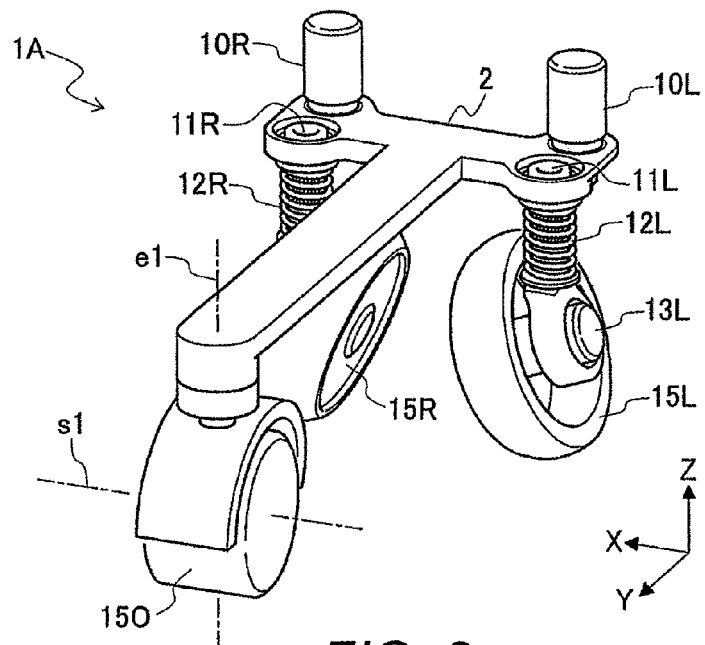
FIG. 7 is a perspective view of a moving mechanism, according to a modification 1, seen from obliquely above in a front direction.

FIG. 7 is a perspective view of a moving mechanism, according to a modification 1, seen from obliquely above in a front direction. In a moving mechanism 1A of the modification 1, a vehicle wheel 15O which can freely rotate around a horizontal axis s1 and around a vertical axis e1 is disposed on the front side of a traveling direction of a vehicle body 2. In other words, the vehicle body 2 is T-shaped. Configurations other than that are similar to those of the embodiment. Therefore, the same components as in the embodiment are denoted with the same sings and a detailed description will be omitted herein.

According to the modification 1, stability of the moving mechanism 1A improves, since it is a three-wheeled vehicle. Therefore, the moving mechanism 1A can be used as a simple vehicle. For example, it may be used as a vehicle for one person such as a housewife and a senior citizen who goes shopping or goes to hospital.

<<Modification 2>>

Figure 8:
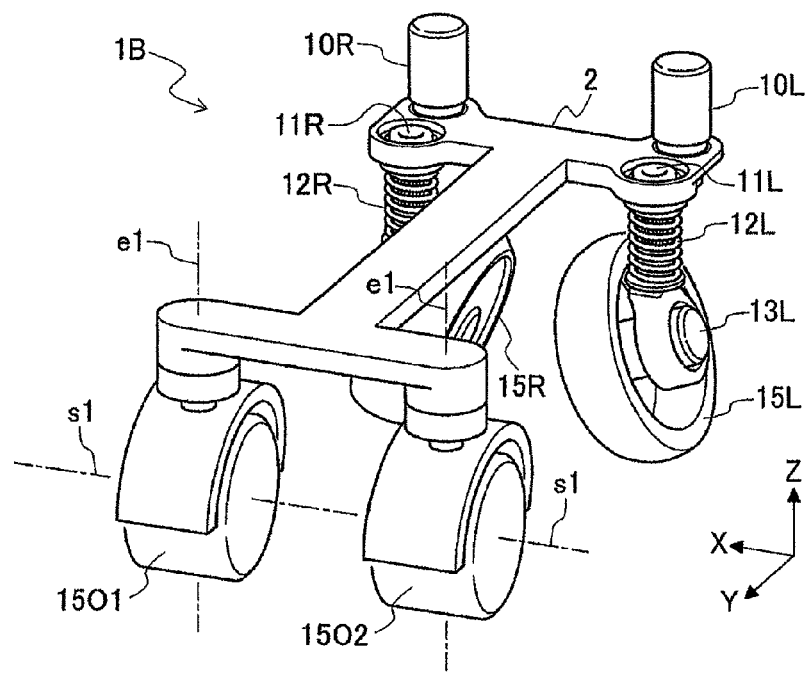
FIG. 8 is a perspective view of a moving mechanism, according to a modification 2, seen from obliquely above in a front direction.
Figure 9:
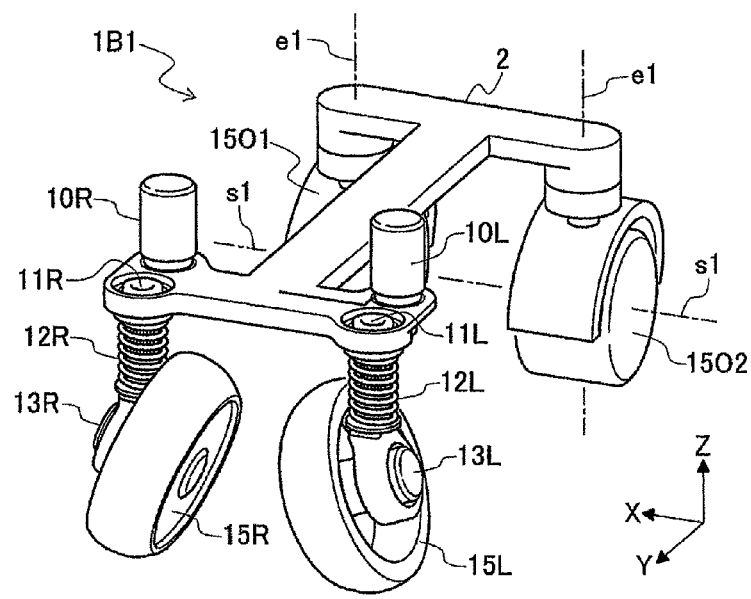
FIG. 9 is a perspective view of another example of the moving mechanism, according to the modification 2, seen from obliquely above in a front direction.

FIG. 8 is a perspective view of a moving mechanism, according to a modification 2, seen from obliquely above in a front direction. In a moving mechanism 1B of the modification 2, two vehicle wheels 15O1 and 15O2, which can freely rotate around a horizontal axis s1 and around a vertical axis e1, are disposed on the front side of a traveling direction of a vehicle body 2. Configurations other than that are similar to those of the embodiment. Therefore, the same components as in the embodiment are denoted with the same sings and a detailed description will be omitted herein. FIG. 9 is a perspective view of another example of the moving mechanism, according to the modification 2, seen from obliquely above in a front direction.

In another example of the modification 2, that is, a moving mechanism 1B1, two vehicle wheels 15O1 and 15O2, which can freely rotate around a horizontal axis s1 and around a vertical axis e1, are disposed on the back side of a traveling direction of a vehicle body 2. In other words, the vehicle body 2 is H-shaped. Configurations other than that are similar to those of the embodiment. Therefore, the same components as in the embodiment are denoted with the same sings and a detailed description will be omitted herein.

According to the modification 2, since the moving mechanism 1A is a four-wheeled vehicle, stability thereof improves as compared to that of a two-wheeled or three-wheeled vehicle. Therefore, it can be used as a simple vehicle for carrying a burden with a certain weight. For example, it can be used as a simple vehicle for one person or two persons.

<<Modification 3>>

Figure 10:
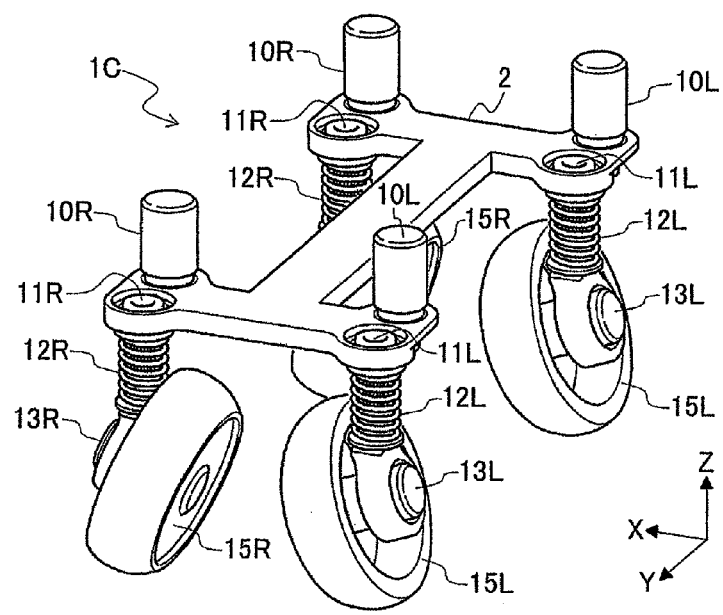
FIG. 10 is a perspective view of a moving mechanism, according to a modification 3, seen from obliquely above in a front direction.
Figure 11:
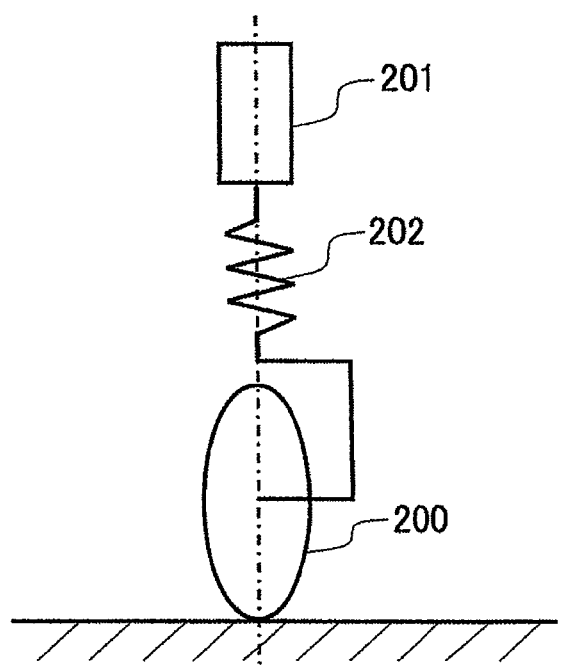
FIG. 11 is a view showing a configuration in the related art in which a steering device and a suspension are built in a vertical direction on the top of a vehicle wheel.

FIG. 10 is a perspective view of a moving mechanism, according to a modification 3, seen from obliquely above in a front direction. In a moving mechanism 1C of the modification 3, a pair of vehicle wheels 15L and 15R is disposed on each of the front and back sides of a traveling direction of a vehicle body 2. Configurations other than that are similar to those of the embodiment. Therefore, the same components as in the embodiment are denoted with the same sings and a detailed description will be omitted herein.

According to the modification 3, since the pair of vehicle wheels 15L and 15R is disposed on each of the front and back sides of the vehicle body 2, stability of the vehicle body 2 improves. Further, since the moving mechanism 1C employs a four-wheel drive, it can improve its traveling performance and can deliberately control its traveling.

<<Other Embodiment>>

In the above-mentioned embodiment and modifications, the suspension springs 12R and 12L have been exemplified as suspension members of the vibration absorbing devices. However, shock absorbers having a damping function may be added to the suspension members. In such a case, the shock absorbers are freely attached to the vehicle body 2 and/or the steering hubs 14L and 14R. Further, it is preferable to prevent the shock absorbers from coming into contact with the vehicle wheels 15L and 15R under the conditions of the Formula (1). Alternatively, coilovers may be used instead of the shock absorbers. The coilovers herein integrate the suspension spring having the elastic function with the shock absorber having the damping function. In such a case, it is preferable to prevent the coilovers from coming into contact with the vehicle wheels 15L and 15R under the conditions of the Formula (1).

Further, other elastic members may be used instead of the suspension springs 12R and 12L as long as those members have the elastic function similar to that of the suspension springs 12R and 12L. In the above-mentioned embodiment, the example in which driving force of the steering actuators 10L, 10R is transmitted to the splines 11L, 11R through the wrapping transmission belt 18L (18R) has been described. However, other transmitting units such as a gear can be used as well. Alternatively, the splines 11L and 11R can be directly driven by the steering actuators 10L and 10R.

In the above-mentioned embodiment, the example of a case where the vehicle wheels 15L, 15R are disposed in the right-left direction with respect to the orientation of the vehicle body 2 has been described. However, the vehicle wheels 15L, 15R can be disposed along the orientation of the vehicle body 2 and along the traveling direction of the vehicle body 2. It should be noted that it is most preferable to dispose the vehicle wheels 15L, 15R in the right-left direction with respect to the orientation of the vehicle body 2, as described in the embodiment.

Hereinbefore, the embodiment and the modifications of the present invention have been described. However, it should be noted that each description is one of the typical examples. Accordingly, the present invention can be variously modified or changed within the scope of the present invention. That is, the present invention can be appropriately and arbitrarily changed within the gist of the invention.

REFERENCE SIGNS LIST 1 moving mechanism
1 vehicle body
10L, 10R steering actuator
11L, 11R spline
12L, 12R suspension spring (suspension member)
13L, 13R vehicle wheel actuator
14L, 14R steering hub
15L, 15R vehicle wheel
15O, 15O1, 15O2 vehicle wheel (second vehicle wheel)
100 ground (traveling surface)
100s grounding point
101L steering axis (driving axis of steering actuator)
102L central point of cross-sectional vehicle wheel (central point of cross-sectional circle)
d distance from steering axis of suspension spring to the side of vehicle wheel
r internal diameter of vehicle wheel
s distance from central point of cross-sectional vehicle wheel to cross-sectional surface on steering side of vehicle wheel
Z vertical axis
θ inclination angle from steering axis

The invention claimed is:

1. A moving mechanism comprising:
   a vehicle body;
   steering actuators which are disposed on right and left sides of the vehicle body and are drivable around a vertical axis;
   right and left steering hubs which are driven by the steering actuators;
   vehicle wheel actuators which are fixed to the steering hubs; and
   vehicle wheels which are driven by the vehicle wheel actuators and are disposed in an inclined manner relative to a vertical direction.

2. The moving mechanism according to claim 1, wherein the vehicle wheels disposed on the right and left sides are disposed in an inclined manner so as to be arranged symmetrically.

3. The moving mechanism according to claim 1, comprising:
   splines and suspension members for connecting the steering actuators and the steering hubs,
   wherein the suspension members expand and contract along the splines and are suspended by the vehicle body and the steering hubs.

4. The moving mechanism according to claim 3, wherein the suspension member is a suspension spring.

5. The moving mechanism according to claim 1, wherein the vehicle wheel has a shape in which the right and left sides of a central cross-sectional circle on a surface vertical to the traveling direction of the vehicle wheel are removed, and
   the center of the cross-sectional circle is located on a steering axis.

6. The moving mechanism according to claim 5, wherein the suspension member is a suspension spring, and
   the moving mechanism satisfies a relation represented by [Formula 2]:

$$d < r \sin\theta - s \cos\theta$$

where r represents an internal diameter of the vehicle wheel, s represents a distance from a central point of a cross-sectional vehicle wheel to a cross-sectional surface on a steering side of the vehicle wheel, $\theta$ represents an inclination angle of the vehicle wheel from the steering axis, and d represents a distance from the steering axis of the suspension spring to the side of the vehicle wheel.

7. The moving mechanism according to claim 1, wherein a driving axis of the steering actuator and a grounding point, which is a contact point between the vehicle wheel and a traveling surface, are arranged in the same straight line.

8. The moving mechanism according to claim 1, wherein one pair of the vehicle wheels is disposed in a direction vertical to the traveling direction of the vehicle body, and
   the moving mechanism comprises a second vehicle wheel which freely rotates separately from the aforementioned vehicle wheels around a vertical axis and around a horizontal axis.

* * * * *